H. J. S. GILBERT-STRINGER & P. W. DRUITT.
APPARATUS FOR COMPOSING AND CASTING TYPE.
APPLICATION FILED AUG. 31, 1911.

1,188,265.

Patented June 20, 1916.
9 SHEETS—SHEET 5.

H. J. S. GILBERT-STRINGER & P. W. DRUITT.
APPARATUS FOR COMPOSING AND CASTING TYPE.
APPLICATION FILED AUG. 31, 1911.

1,188,265.

Patented June 20, 1916.

UNITED STATES PATENT OFFICE.

HENRY JAMES SYDNEY GILBERT-STRINGER, OF COUNTY OF SUSSEX, AND PERCY WALTER DRUITT, OF COUNTY OF SURREY, ENGLAND, ASSIGNORS, BY MESNE ASSIGNMENTS, TO EDWARD HERON ALLEN AND ARTHUR FRANK DE FONBLANQUE, BOTH OF LONDON, ENGLAND.

APPARATUS FOR COMPOSING AND CASTING TYPE.

1,188,265.   Specification of Letters Patent.   Patented June 20, 1916.

Application filed August 31, 1911. Serial No. 647,059.

*To all whom it may concern:*

Be it known that we, HENRY JAMES SYDNEY GILBERT-STRINGER and PERCY WALTER DRUITT, both subjects of the King of Great Britain, residing, respectively, in the county of Sussex, England, and the county of Surrey, England, have jointly invented certain new and useful Improvements in Apparatus for Composing and Casting Type, of which the following is a specification.

This invention relates to machines for composing and casting type of the general character of the machines described in United States Letters Patent Nos. 675827, 675828 and 675829, all of 1901, and in application for U. S. patent Serial No. 543506 filed 12th February 1910.

While the primary object of the present invention is to simplify the construction of such apparatus, the improved apparatus differs so radically from previous machines in certain important features as practically to constitute a new type of machine. Thus for example, according to the present invention the use of expanding space matrices is entirely dispensed with in the justification of the line of matrices.

The invention comprises other new or improved devices and methods of operating in connection with the assembling and justifying of the matrices and their presentation to the mold and subsequent distribution which separately and conjointly contribute to the simplification and increased efficiency of apparatus of this character.

We believe ourselves to be the first to combine together and employ in an apparatus which casts and composes lines of justified individual types ready for inclusion in a form for printing, mechanism for selecting from magazines in which they are stored matrices from which character and space types are subsequently to be cast, means for assembling them in line, means for ascertaining the set width of such line as compared with the set width of the desired composition, means for dividing the difference between the said set widths by the number of spaces, and so controlling the mold that when such space matrices are presented to the mold the space cast will coincide with such predetermined thickness irrespective of the set thickness of such matrices, such controlling mechanism being inoperative when a character matrix is presented to the mold, and we claim this broadly and in all its equivalent forms.

The various parts of the machine constituting the present invention will be hereinafter described as far as possible in the proper sequence of the various operations effected by the machine in which the matrices are concerned from the moment the matrices leave the magazine until they are returned thereto, it being premised that the particular mechanical devices hereinafter described for effecting or controlling these operations are capable of modification without exceeding the scope of the invention, the characteristic feature of which is the method of effecting justification without the use of expanding space matrices.

In the accompanying drawings

Figure 4:
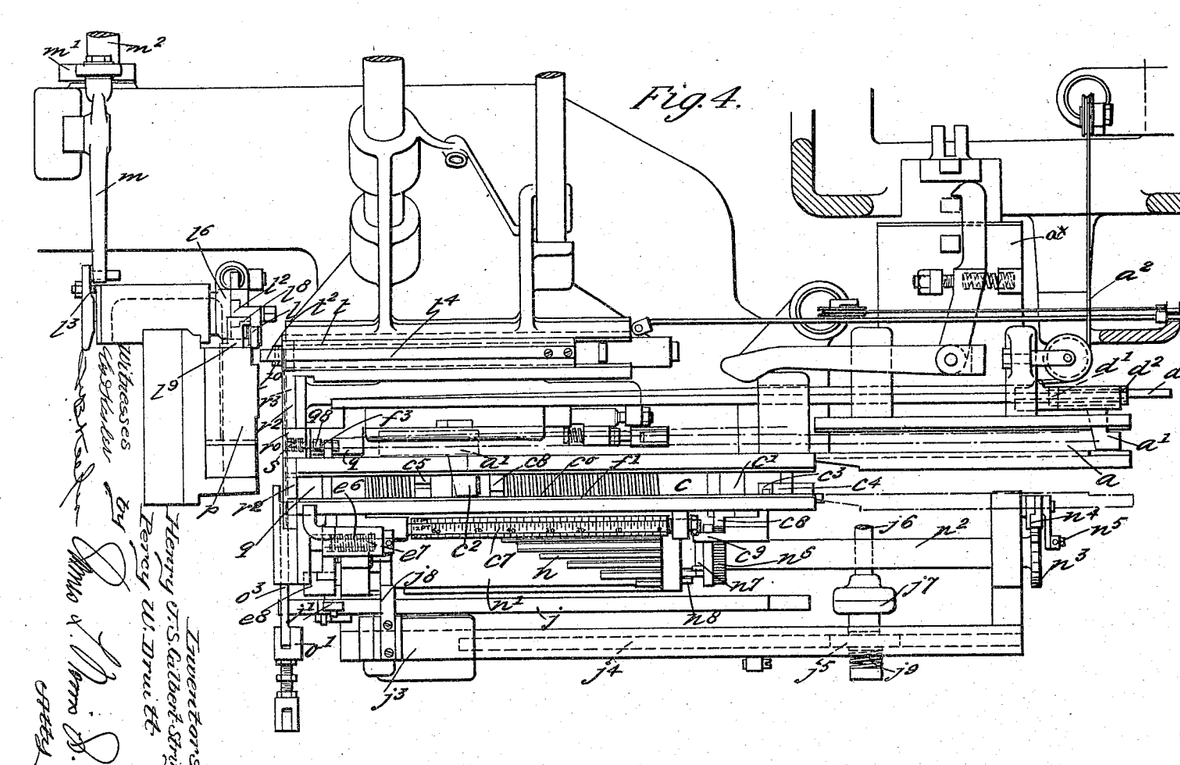
Fig. 4 is a part plan view.

The line of matrices delivered to the assembly box $a$ from the magazine $b$ is engaged by an abutment $a'$ which is slidably mounted on a rail $a^0$ forming part of the assembly box and which remains in engagement with the line of matrices on the forward travel of the assembly box and until the matrices are shifted laterally to the justifying position and partially embraced by the justifying vise $c$; the rearward movement of the assembly box disengages the abutment $a'$ from the matrices, the abutment being returned to its initial position by means of a weight or spring acting on the cord $a^2$ during a momentary pause in the rearward movement of the assembly box, which is reciprocated between its forward and rearward positions (shown respectively in dotted and full lines in Fig. 4) by means of a slide $a^x$ (Fig. 4) actuated in the usual way by a cam, not shown in the drawing. The length-of-line indicating rod $d$ is so correlated with the line abutment $a'$ that it is moved in accordance with the movement of the abutment as the matrices are assembled and indicates by means of a pointer $d^0$ and scale $d^3$ the length of the line. As shown, two lugs $d'$ $d^2$ on the rod embrace the line abutment $a'$ closely so as to be moved therewith, the rear lug $d^2$ being made to project outward farther than the other lug $d'$. The forward movement of the assembly box disengages the abutment from the indicating rod, while upon the rearward movement of the assembly box the line abutment $a'$ first shifts the indicating rod during the momentary pause in the rearward movement of the assembly box to its stop or zero position by engagement with the long rear lug $d^2$, and then assumes a relation therewith which insures the advancement of the indicating rod with that of the abutment by moving into a position in which it is embraced by both lugs $d'$ $d^2$. The final part of the rearward movement of the assembly box brings the abutment $a'$ within the two lugs $d'$, $d^2$ so as to be embraced thereby.

Figure 5:
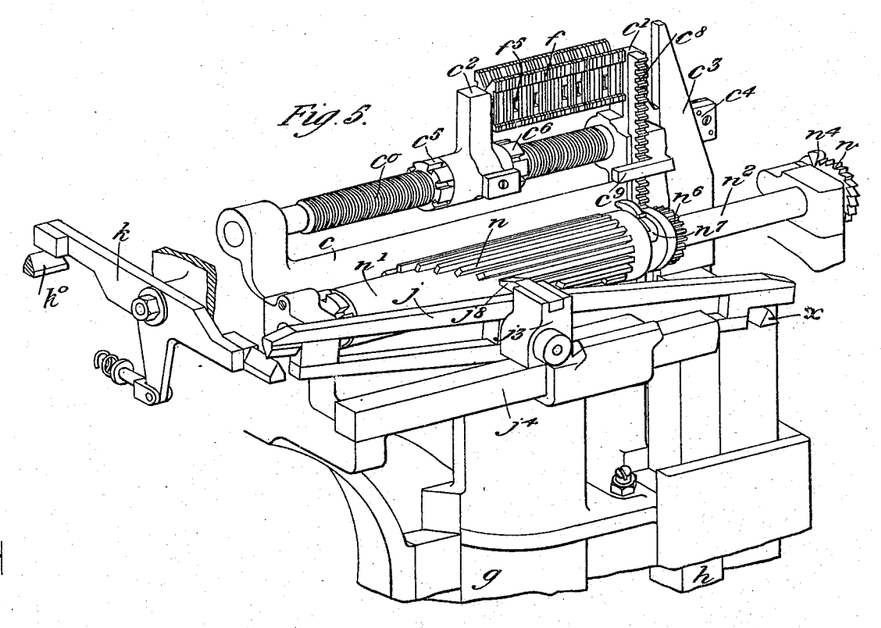
Fig. 5 a perspective view showing the justifying mechanism.
Figure 8:
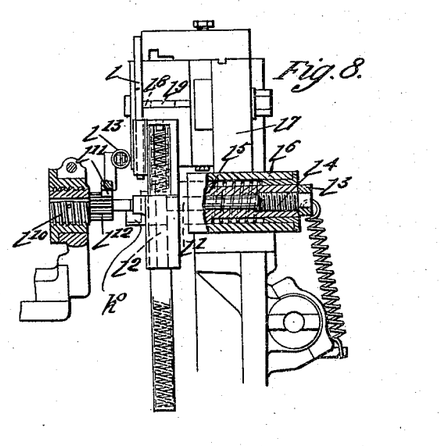
Fig. 8 a sectional elevation taken transversely to Fig. 7.

To insure the line of matrices being in the proper position to be embraced by the vise $c$ when conveyed between the line abutment $a'$ and the line drive $e$ to the justifying position, the vise $c$ which is guided for vertical movement, is partly elevated so that its fixed jaw $c'$ arrests the travel of the line drive $e$ by engagement with a projection therefrom $e'$. A further slight elevation of the vise $c$ enables it to embrace the line of matrices (Fig. 5), whereupon the line drive $e$ is retracted and the elevation of the vise completed. The line abutment $a'$ moves simultaneously with the retraction of the line drive $e$, the adjustable jaw $c^2$ of the vise being closed upon the matrices before the line abutment is withdrawn. The vise is carried by a vertically guided spring-urged slide $g$ and is returned against the spring $g'$ by means of the main elevating slide $h$, a flange on slide $h$ engaging slide $g$ and depressing it, thereby lowering the vise and at the same time compressing the spring $g'$, the travel in both directions being determined by means of adjustable stops $g^2$, $g^3$. The main slide $h$ is actuated by means of a cam $i'$ driven from the main shaft $i$ through a lever $h'$ which is suitably spring-connected so as to permit the slide $h$ to be arrested on its downward stroke, the excess movement of the cam $i'$ being absorbed by the spring connection $h^2$. The adjustable jaw $c^2$ of the vise is closed upon the line of matrices by the elevation of a spring-urged or friction driven justifying wedge $c^3$ which engages a projection $c^4$ on the vise shaft or spindle $c^0$ carrying the adjustable jaw $c^2$, the elevation of the wedge being arrested by the jaw closing upon the line of matrices. The extent to which the wedge $c^3$ is raised thus depends upon the length of the assembled line of matrices, and this movement of the wedge is transferred through the medium of a rocking beam or lever $j$ having an adjustable fulcrum to spring-returned stop or lever $k$ which determines the correct vertical position of an upwardly spring-urged slidably mounted mold space wedge $l$. The knife edge $k^0$ (Figs. 5 and 8) is integral with the slide $l^2$ of the wedge $l$ and engages the lever $k$, and the knife edge $x$ (Fig. 5) is integral with the slide of wedge $c^3$ and engages under the end of the beam $j$. The position of this wedge determines the size of the mold for the time and consequently the size of the space to be cast; the higher the mold space wedge the larger will be the size of the mold. The beam $j$ is returned to its normal position after justification by means of rollers $j'$ $j^2$ pressing downwardly and upwardly respectively on its opposite ends.

To provide for lines of different measure the sliding spindle $c^0$ on which the adjustable jaw $c^2$ of the vise is mounted is screw-threaded along its length and provided with lock-nuts $c^5$, $c^6$ one on either side of the adjustable jaw, a scale $c^7$ being provided to facilitate the setting of the jaw by means of the lock-nuts at the position on the spindle corresponding to any given measure.

Figures 7, 12:
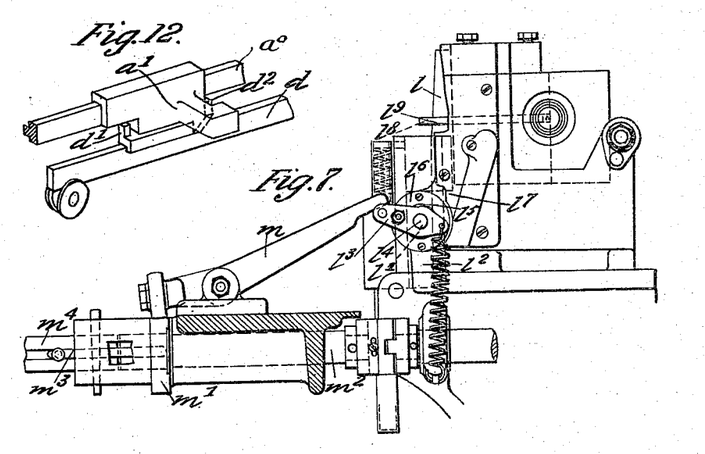
Fig. 7 a transverse sectional elevation on a different plan showing the mechanism for locking the mold wedge.
Fig. 12 a perspective view showing the assembly line abutment.

The appropriate elevation of the mold space wedge $l$ having been determined, the wedge is locked in position by a plunger $l'$ which is pushed against the wedge slide $l^2$ by a spring-urged lever $l^3$ adjustably mounted on the space wedge housing. As shown more particularly in Figs. 7 and 8, the lever $l^3$ is adjustably clamped (being split and secured by screws) on the end of a screwed rod $l^4$ which works in a screw threaded sleeve $l^5$ integral with the frame or guide in which the slide $l^2$ moves. The rotation of the lever in one direction advances the screwed rod $l^4$ so as to clamp the slide $l^2$ by means of the plunger $l'$. The pressure on the slide is released preparatory to re-setting for the next line by means of a lever $m$ moved by a cam $m'$ mounted on the galley shaft $m^2$. Provision is made for rotating the galley shaft $m^2$ manually without releasing the mold space wedge $l$ as by constructing the boss of the cam as a slidable coupling connecting the galley shaft with the driving shaft, or as shown in Fig. 7, by means of a sliding feather $m^3$ on the driving shaft $m^4$ which in one position couples the cam $m'$ on the shafts $m^2$, $m^4$, and in another position is withdrawn from the coöperating groove in shaft $m^2$ so as to enable the latter to be rotated.

Figure 3:
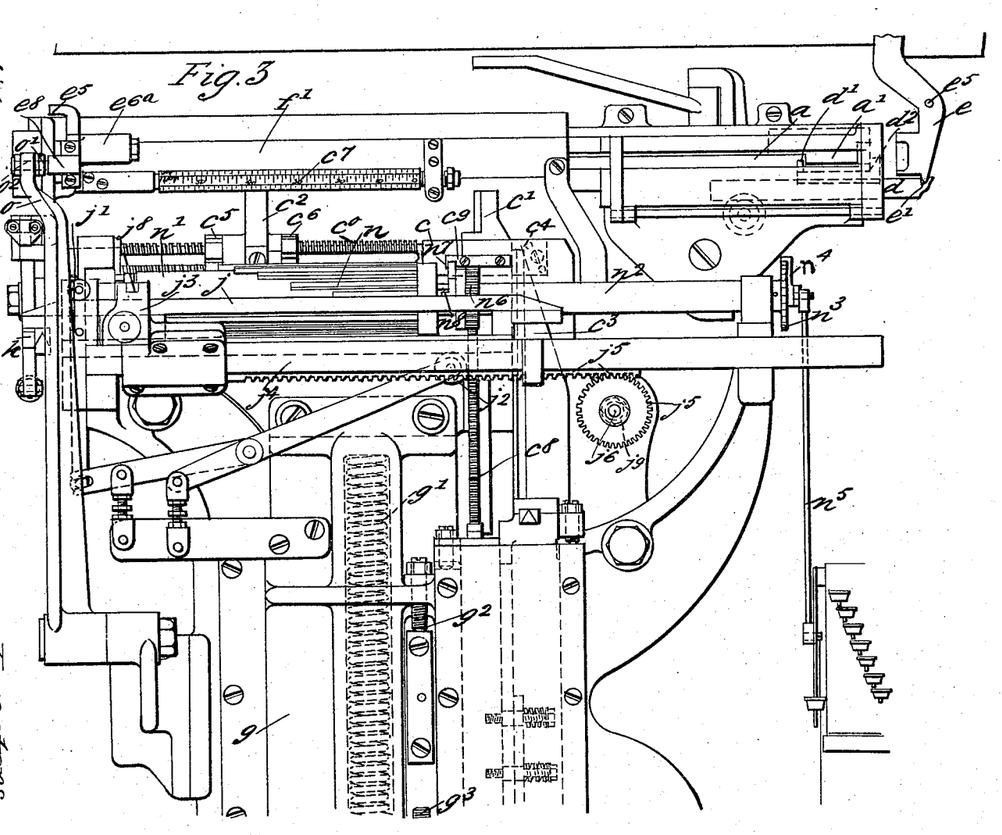
Fig. 3 is a part front view.
Figure 6:
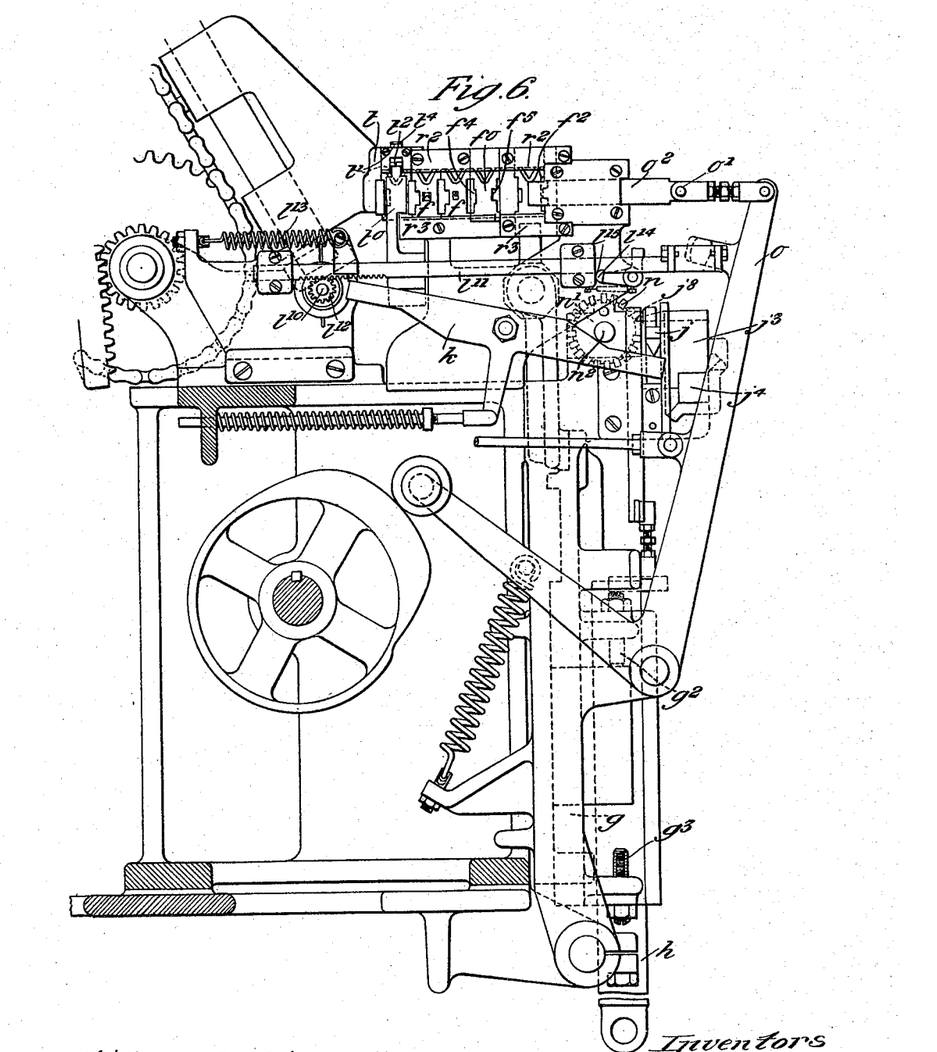
Fig. 6 a transverse sectional elevation showing the separation mechanism.
Figures 9, 11, 15:
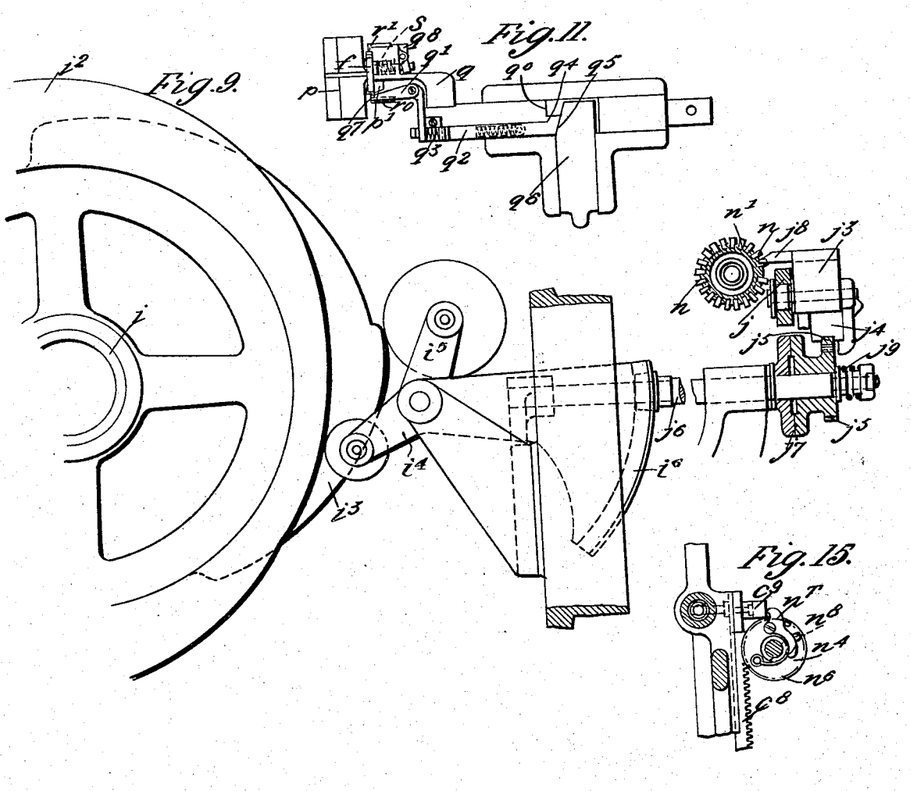
Fig. 9 a transverse sectional elevation showing the mechanism for actuating the fulcrum block hereinafter described.
Fig. 11 a front view of the last but with the parts in a different position.
Fig. 15 a sectional view showing the device by which the stop drum is returned to its zero position.

The rocking beam $j$ above referred to is fulcrumed in a block $j^3$ slidably mounted on a bar $j^4$ parallel with the beam and the position of this block, and consequently the position of the mold space wedge $l$, is determined by means of a series of stops $n$ suitably spaced longitudinally and circumferentially on the periphery of a drum $n'$ which is mounted on a spindle $n^2$ suitably journaled in the frame. On one end of this spindle is an escapement wheel $n^3$ having teeth equal in number to the stops, the rotation of which wheel is controlled by a pallet $n^4$ actuated through suitable linkage $n^5$ by the space key on the keyboard of the machine, the depression of which permits the spindle $n^2$ to rotate through an angle corresponding to one tooth. The fulcrum block $j^3$ is shifted to its operative position by means of a rack and pinion $j^5$ actuated, through shaft $j^6$ and a yielding or frictional drive $j^7$, by a cam $i^2$ on the line shaft $i$, and is returned to its normal position by the operation of the pinion $j^5$ in the reversed direction by means of a cam $i^3$ on the line shaft, the cams $i^2$, $i^3$ operating cam levers $i^4$, $i^5$ to oscillate the quadrant $i^6$ (Fig. 9) which engages a pinion on the shaft $j^6$, and the drum $n'$ is returned to its normal or zero position after justification by means of a rack $c^8$ suitably housed in the vise and having its tail dovetailed to the top of the main elevating slide $h$, whch rack causes the rotation of a pinion $n^6$ mounted coaxially with the drum but free to rotate independently thereof, a spring-urged pawl $n^7$ mounted on the pinion effecting the rotation of the drum by engagement with a pin $n^8$ projecting therefrom. This pawl is held out of engagement with the pin by a projection $c^9$ on the vise during the operation of assembly so as to enable the drum $n'$ to rotate with each release of the escapement wheel $n^3$, the downward movement of the rack $c^8$ and consequent rotation of pinion $n^6$ bringing the tail of pawl $n^7$ against the face of stop $c^9$. The cam $i^2$ is of such character that a torque is continuously exerted during the period of justification between the friction disk $j^7$ and the pinion $j^5$, so that although the latter is prevented from rotating by engagement of one of the stops $n$ with the coöperating abutment or finger $j^8$ on the fulcrum block $j^3$, the resultant pressure between the finger $j^8$ and the stop $n$ will prevent the finger being shaken off the stop and the justification of the line being thereby affected. On completion of the justification or measurement of the line of matrices, the vise $c$ is returned to its extreme downward position clear of the matrix raceway $f'$, thereby permitting the weight-urged line drive $e$ to advance the line of matrices to the separation position. In order that the mold space wedge $l$ should come into operation only on the presentation of a justifying space matrix $f^6$ to the mold, the housing $l^6$ of the vertical slide $l^2$ carrying the mold space wedge $l$ is mounted to slide transversely on the mold bracket $l^7$, thereby enabling the space wedge to be moved into or out of the path of a projection $l^8$ on the mold body blade $l^9$. The movement of the transverse slide $l^6$ into its operative position in which the space wedge $l$ coöperates with the body blade $l^9$ of the mold, is effected by the advance of a screw-threaded spindle $l^{10}$ abutting against the housing $l^6$ which is rotated by means of a slidably mounted rack $l^{11}$ meshing with a pinion $l^{12}$ on the screwed spindle. This rack is spring-urged in the direction for sliding the space wedge into the operative position and its movement under the action of the spring $l^{13}$ is controlled by means of a pivoted detent $l^{14}$ engaging a notch or tooth $l^{15}$ on the rack so as to hold the latter in the inoperative position until the detent is released, as shown in Figs. 3 and 6, by engagement with the separation pusher lever $o$ acting as a space feeler lever, consequent upon the additional stroke of the lever or pusher following the separation of a space matrix as described in British patent specification No. 9932 of 1907.

The line drive carriage $e^2$ which is urged forwardly by a weight $e^9$ and retracted positively by means of cam $i'$ on line shaft $i$ acting through spring-urged cam lever $e^4$, rod $e^{4a}$, crank $e^{4b}$, shaft $e^{4c}$, friction clutch $e^3$ and link $e^{3a}$, is provided with a projecting piece $e^5$ adapted to engage a sleeve $e^6$ slidably mounted on a spindle $e^7$ and carrying at one end a block $e^8$ which is normally spring-urged out of the path of the link $o'$ connecting the separation pusher $o^2$ with its actuating cam lever $o$. After separation of the last matrix, the further travel of the line drive carriage $e^2$, under the action of its driving weight, brings this projecting piece $e^5$ into engagement with an inclined projection $e^{6a}$ on the sliding sleeve $e^6$ thereby shifting it longitudinally so as to project the block $e^8$ mounted on the sleeve into the path of the coöperating end of the driving link $o'$ which connects the separation pusher $o^2$ with its cam lever $o$ and thus preventing the latter completing its forward movement. This interruption of the normal movement of the separation pusher lever $o$ brings into operation a safety stop mechanism such as described in patent specification No. 15468 of 1906, which mechanism is further utilized for effecting the stoppage of the casting section of the machine.

Figure 10:
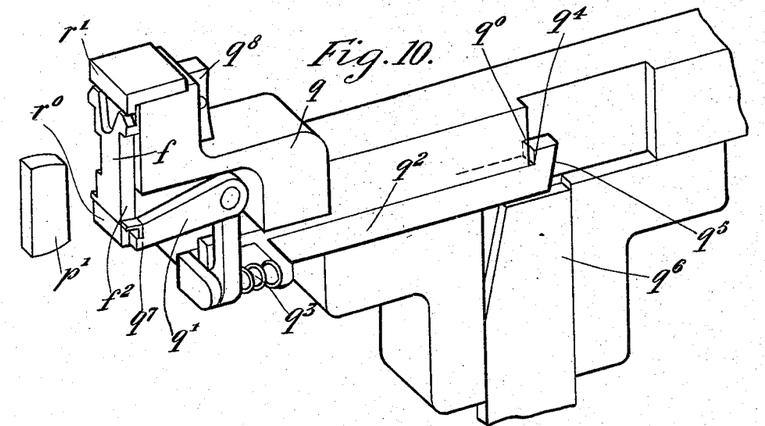
Fig. 10 a perspective view of the presentation plunger.

To obviate the necessity for very perfect accuracy in the construction of the alining piece $p'$ (Figs. 10 and 11) of the mold $p$ and of the matrices $f$ and avoid undue wear on those parts of the matrices which determine the alinement of the line of matrices, the alining notch $f^2$ of the matrix is not permitted to engage the coöperating edges of the alining piece $p'$ during the travel of the matrix to the mold, until upon coming in contact with the mold, the matrix is raised to bring the lower side of the alining notch $f^2$ into contact with the coöperating edge of the alining piece $p'$. This movement is conveniently effected by means of a flexible arm $q'$ (Figs. 10 and 11) of a bell crank mounted on a suitable fulcrum in the presentation plunger $q$, which is elevated by means of a longitudinal plunger $q^2$ slidably mounted in the presentation plunger and pressing, through a cushioning spring $q^3$, on the other arm of the bell crank. The opposite end of this longitudinal plunger $q^2$ is provided with a projecting piece one face $q^4$ of which lies in a plane at right angles to the axis of the plunger, while the other face $q^5$ is inclined to this axis. When the presentation plunger $q$ travels forward toward the mold $p$, the inclined edge of a locking wedge $q^6$, guided for longitudinal movement and actuated through a suitable arrangement of levers not shown in the drawings from the line shaft, engages the inclined surface $q^5$ of this projecting piece, thereby pressing the longitudinal plunger $q^2$ toward the mold $p$ and, through the spring $q^3$, elevating the toe $q^7$ of the bell crank which, protruding into the lower rail $r^0$ of the two guide rails $r^0$, $r'$ carried by the presentation plunger, engages the matrix and raises it vertically. Further movement of the longitudinal plunger $q^2$ in the same direction under the effort of the locking wedge $q^6$ compresses the cushioning spring $q^3$ and brings the face $q^4$ of the projecting piece on the plunger $q^2$ into abutment with a coöperating surface $q^0$ on the presentation plunger, thereby locking the latter on the face of the mold.

To reduce the wear on the matrices when being separated for presentation to the mold, the spring-urged plungers formerly provided which exert continuous pressure on the matrix, are replaced according to the present invention by a single spring plunger $s$ (Figs. 4 and 11) which exerts pressure on the matrix only during its travel to and from the mold. This plunger $s$ is held out of engagement with the matrix, on the completion of the rearward travel of the presentation plunger $q$, by means of a lever $q^8$ pivotally connected therewith coming into contact with an adjustable stop $f^3$ (Fig. 4) suitably mounted upon a fixed part of the frame.

Figure 1:
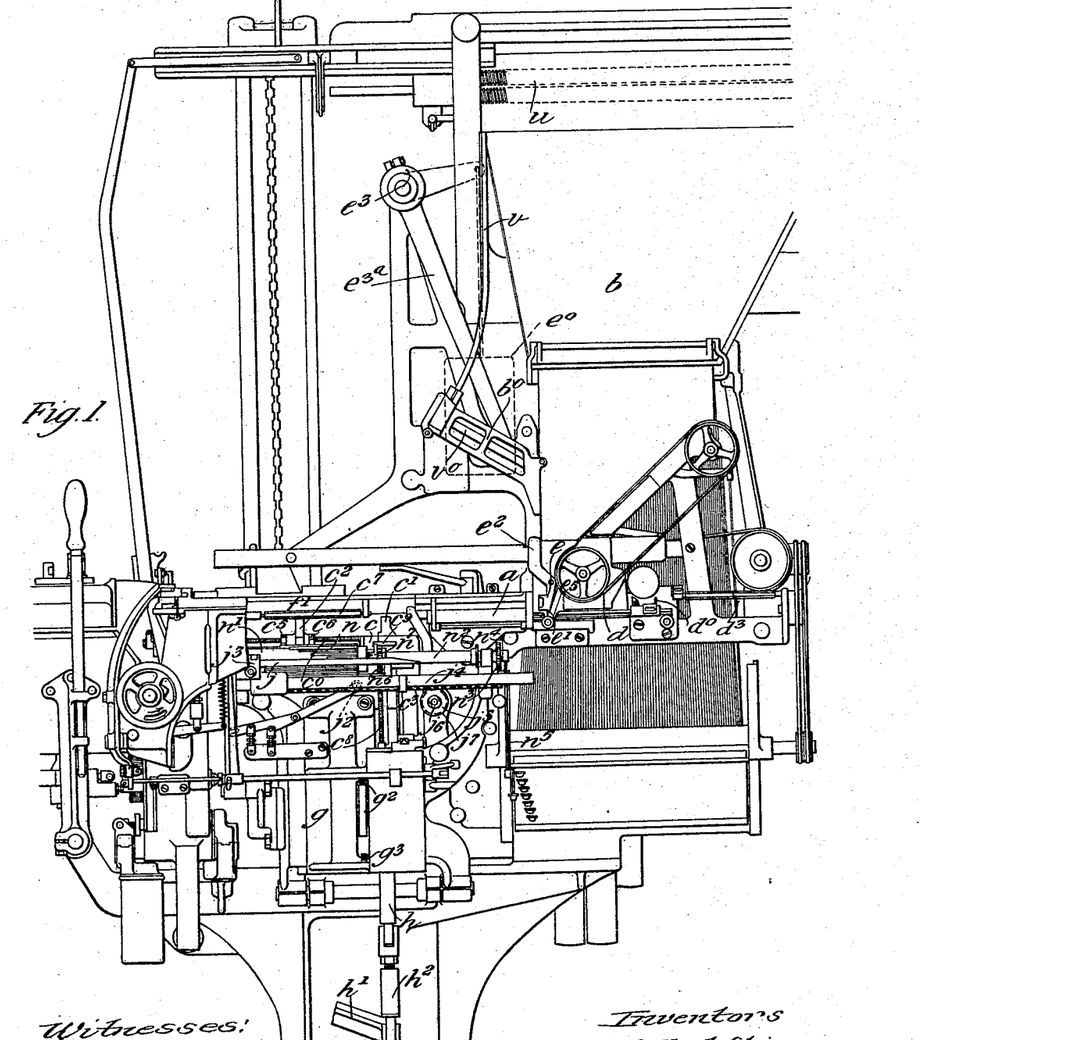
Figure 1 is a front elevation of the complete machine.
Figure 2:
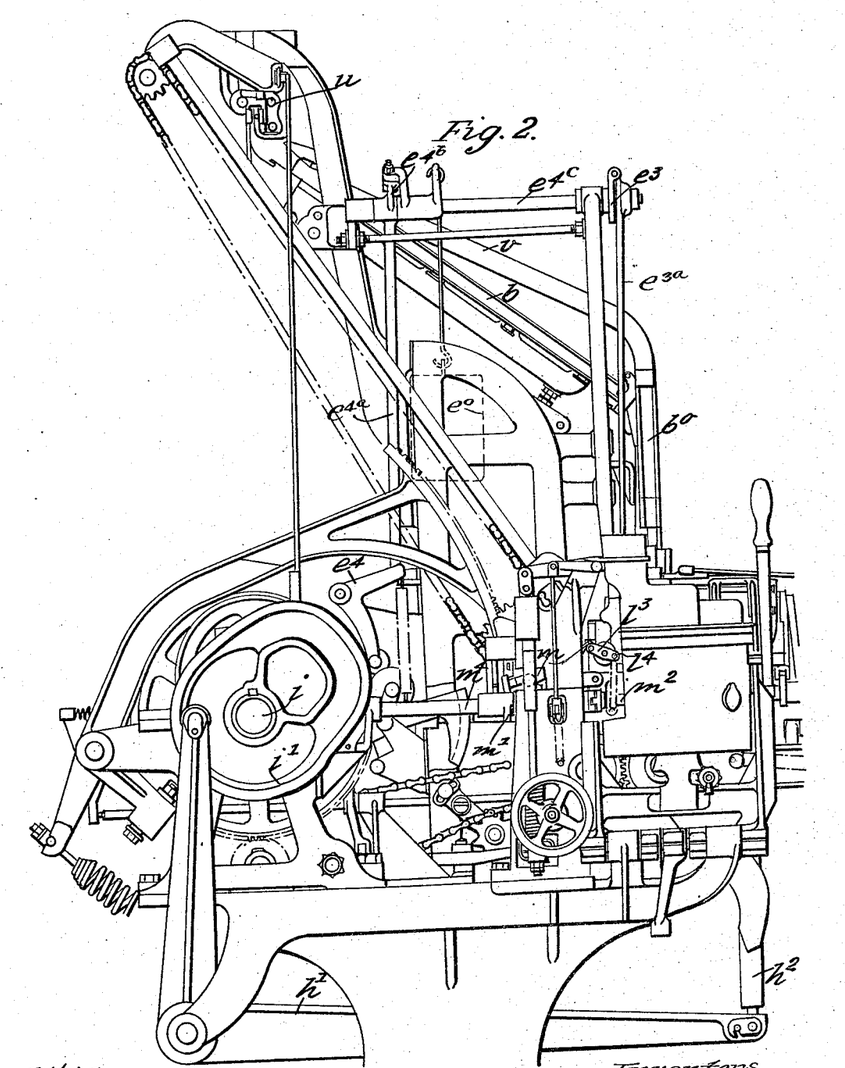
Fig. 2 an end elevation looking at the end opposite to the magazine.
Figures 13, 14:
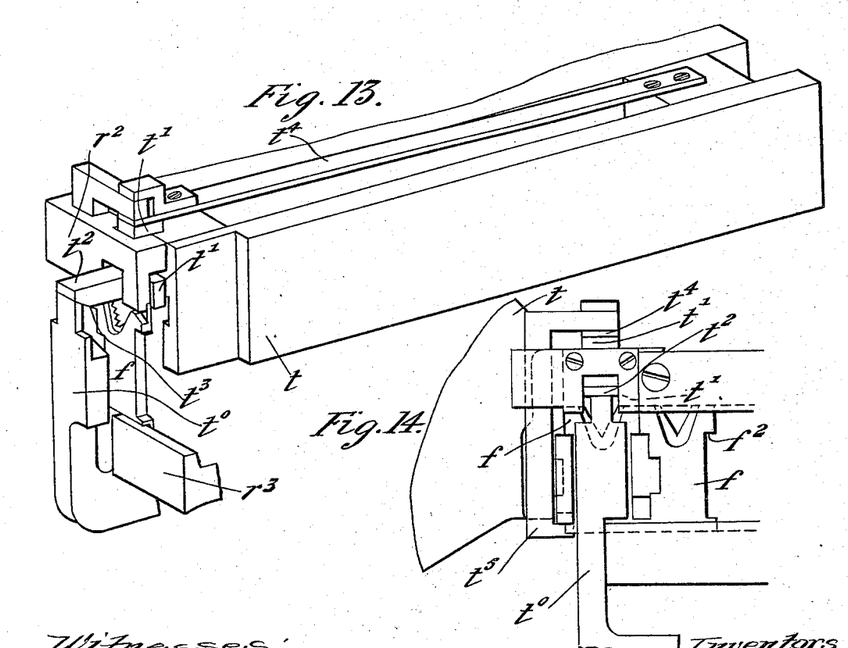
Fig. 13 a perspective view of a device whereby matrices are prevented from entering the assembly box prematurely.
Fig. 14 an end elevation of same mechanism.

Simple, that is to say non-expanding-justifying matrices $f^0$ are employed of a thickness corresponding to the maximum justifying space produced and differing from the character matrices $f$ only by having an additional notch $f^5$ opposite the set notch $f^4$ as described in patent specification No. 9932 of 1907, and by having no intaglios thereon. This simple form of justifying space, having no depending tapering blade with which some space matrices, such as those described in the British Patent No. 1903 of 1900, are provided, and being of the same depth as the character matrices, enables the matrix separation guide rails $r^2$, $r^3$ which are a fixed continuation of the rails $r^0$, $r'$, to be carried across the ends of the matrix raceway $f'$ and thus to form a continuous channel for the separation of the matrices. The intermittent impulses imparted by the separation plunger $o^2$ to the matrices in the raceway $r^2$, $r^3$ have been found to give rise to jamming the presentation plunger, e. g. by the matrices being prematurely jumped into or toward the re-assembly box $t$ so that the succeeding matrices are not arrested at the proper position in the raceway, with the result that the presentation plunger may be forced against a matrix which has gone beyond the correct position for presentation to the mold and has entered the fixed raceway $r^2$, $r^3$, thereby stopping the apparatus. To prevent the locking of the presentation plunger by reason of the matrix which ought to close the mold being displaced due to this or other cause, the re-assembly box $t$ is fitted with a gate or gates adapted to prevent entry of the leading matrix in the raceway $r^2$, $r^3$ into the re-assembly box until the gate or gates are displaced positively by the action of the plunger $t^0$ which operates to force the matrices in turn into the re-assembly box. As shown more particularly in Figs. 6, 13 and 14, two gates are fitted, an upper bifurcated gate $t'$ the limbs of which normally project downwardly into the path of the two upper lugs of the matrix and which has an outwardly projecting piece $t^2$ having an inclined surface $t^3$ which coöperates with a correspondingly inclined surface on an upwardly projecting part of the re-assembly plunger $t^0$, so that when the latter comes forward, it first lifts the gate $t'$ and then presses the leading matrix into the re-assembly box $t$. The gate $t'$ is suitably guided and is returned to its normal position by means of a spring preferably in the form of the long flat spring $t^4$ (Fig. 13) one end of which is fixed to the gate and the other to the re-assembly box. In addition to the upper gate $t'$ there is preferably a lower gate $t^5$ which moves with the upper gate and is normally urged by the common return spring $t^4$ into the path of one of the lower lugs of the matrix. The conveyance of the matrices from the jaws of the vise to the separation guide rails and the operation of re-assembly plunger end of the elevator by which the matrices are raised to the distributer are all well known, being described in the United States specifications hereinbefore referred to, and form no part of the present invention. Both the character matrices and the justifying matrices, after re-assembly, are elevated direct to the distributer $u$ by which they are transferred in the usual manner to the magazine $b$, which may be provided with compartments to receive the justifying space matrices as well as the character matrices. Alternatively, as shown in Figs. 1 and 2, the justifying space matrices $f^0$ are delivered to a channel $v$ which communicates with a separate space box or magazine $b^0$. In the latter case the justifying space matrices $f^0$, on leaving the distributer bar, fall into and are guided down the chute $v$ the lower end of which is arranged at right angles to a pair of inclined rails $v^0$ mounted in the space box $b^0$, down which they slide to the position from which they are afterward released in the usual manner as required.

Having thus described the nature of this invention and the best means we know of carrying the same into practical effect, we claim:—

1. An apparatus for casting from character and space matrices and composing lines of justified individual types for inclusion in a form for printing, which comprises in combination means for assembling character and space matrices in line, means for measuring the actual length of the line to ascertain its set width as compared with the set width of the desired composition, means for dividing the difference between the said widths by the number of spaces, a controllable mold for casting individual types from the matrices, means operating to control the mold whereby, when such space matrices are presented to the mold, the set thickness of the cast space will vary to the required amount from that of the space matrix, and means whereby said controlling mechanism is rendered inoperative when a character matrix is presented to the mold.

2. In an apparatus for producing a justified line of individual types, a matrix assembly box adapted to be reciprocated forwardly and rearwardly, a line abutment slidably mounted on said assembly box and adapted to engage the line of matrices on the forward movement of the box and to be disengaged by the rearward movement of the box, substantially as described.

3. In an apparatus for producing a justified line of individual types, a matrix assembly box adapted to be reciprocated forwardly and rearwardly, a line abutment slidably mounted on said assembly box, a length of line indicating rod, means coupling the said rod with the line abutment and adapted to disengage upon the forward movement of the assembly box, and means whereby upon the rearward movement thereof the line abutment shifts the rod to its initial position, substantially as described.

4. In an apparatus for producing a justified line of individual types, a reciprocating line drive adapted to be reciprocated forwardly and rearwardly and operating to convey the assembled line of matrices to the justifying position, a justifying vise guided for vertical movement, means for elevating the vise partly to arrest the travel of the line of matrices, means for further raising the vise to embrace the line of matrices, the elevation being completed upon retraction of the line drive, substantially as described.

5. In an apparatus for producing a justified line of individual types, a justifying vise carried by a vertically guided spring-urged slide, and a main elevating slide actuated by a cam on the main shaft adapted to return the vise from its raised position, substantially as described.

6. In an apparatus for producing a justified line of individual types, a justifying vise having a fixed and a movable jaw, a yieldingly driven justifying wedge coöperating with said movable jaw, means depending upon the length of the assembled line of matrices determining the extent of movement of said wedge, a mold space wedge, a stop controlling the adjustment of said mold space wedge and means for setting the stop determined by the extent of movement of the justifying wedge, substantially as described.

7. In an apparatus for producing a justified line of individual types, a justifying wedge, a mold space wedge, a rocking beam having an adjustable fulcrum, means actuated by the rocking beam for setting the mold space wedge whereby the movement of the justifying wedge is arranged to control the adjustment of the mold space wedge, a rotatable drum, a series of stops spaced longitudinally and circumferentially on the periphery of the drum and means controlled by the space key on the key board of the machine whereby the drum can be set to determine by means of the stops the position of the adjustable fulcrum of the rocking beam substantially as described.

8. In an apparatus for producing a justified line of individual types, a stop drum controlled by the space key on the keyboard of the machine, an escapement wheel upon said stop drum and a pallet coöperating with said escapement and actuated by means of the space key whereby the angle through which the drum can rotate is determined, substantially as described.

9. In an apparatus for producing a justified line of individual types, a rocking beam having an adjustable fulcrum block, a rack and pinion adapted to shift said fulcrum block, a cam on the line shaft and a yielding drive actuated by the cam to operate said rack and pinion, substantially as described.

10. In an apparatus for producing a justified line of individual types, a line drive carriage, a separation pusher, a spindle having a sleeve slidably mounted thereon and adapted to be engaged by the line drive carriage, a block carried by said sleeve, means normally urging said block out of engagement with the separation pusher, and means operating upon the travel of the line drive carriage after separation of the last matrix to project said block into position, preventing the actuating cam lever of the separation pusher completing its forward movement, substantially as described.

11. In an apparatus for producing a justified line of individual types, a re-assembly box, a gate fitted upon said box adapted to prevent entry of the leading matrix in the raceway, a re-assembly plunger and means operated by the action of the plunger to displace the gate, substantially as described.

In testimony whereof we have signed our names to this specification in the presence of two subscribing witnesses.

HENRY JAMES SYDNEY GILBERT-STRINGER.
PERCY WALTER DRUITT.

Witnesses:
  WALTER J. SKERTEN,
  T. J. OSMAN.

Copies of this patent may be obtained for five cents each, by addressing the "Commissioner of Patents Washington, D. C."